United States Patent
Petit et al.

(10) Patent No.: US 6,655,939 B1
(45) Date of Patent: Dec. 2, 2003

(54) FACILITY FOR PRODUCING LATEX OBJECTS SUCH AS PILLOWS

(75) Inventors: Patrick Petit, Seilh (FR); Georges Ubanell, Toulouse (FR)

(73) Assignee: Biotex Production S.A., Castelginest (FR)

( * ) Notice: Subject to any disclaimer, the term of this patent is extended or adjusted under 35 U.S.C. 154(b) by 0 days.

(21) Appl. No.: 09/582,573

(22) PCT Filed: Jan. 27, 1998

(86) PCT No.: PCT/FR98/00144
§ 371 (c)(1),
(2), (4) Date: Jul. 24, 2000

(87) PCT Pub. No.: WO99/37455
PCT Pub. Date: Jul. 29, 1999

(51) Int. Cl.[7] .............................................. B29C 44/46
(52) U.S. Cl. ................... 425/4 R; 425/817 R; 425/384
(58) Field of Search .............................. 425/817 R, 4 R, 425/384

(56) References Cited

U.S. PATENT DOCUMENTS

| | | | |
|---|---|---|---|
| 2,755,505 A | 7/1956 | Bishop | 425/452 |
| 3,801,255 A | * 4/1974 | Meyer et al. | 425/147 |
| 3,924,995 A | * 12/1975 | Crooks et al. | 425/243 |
| 4,560,346 A | 12/1985 | Schulz | 432/24 |
| 4,961,888 A | 10/1990 | Brown | 264/40.6 |
| 5,229,138 A | 7/1993 | Carotti | 425/4 C |
| 6,086,802 A | * 7/2000 | Levera et al. | 264/51 |

FOREIGN PATENT DOCUMENTS

| | | |
|---|---|---|
| DE | 29 23 482 A | 12/1980 |
| FR | 2 684 591 A | 6/1993 |

* cited by examiner

*Primary Examiner*—Jan H. Silbaugh
*Assistant Examiner*—Joseph S Del Sole
(74) *Attorney, Agent, or Firm*—Harrison & Egbert

(57) ABSTRACT

A facility including molds into each of which a latex foam is introduced and a furnace into the vulcanizing chamber of which the molds are introduced with a view to vulcanizing the latex foam for the formation of articles. The facility further includes a mold filling station for filling the molds with latex foams, a stripping station for removing the articles and a washing unit and drying unit for the stripped articles. The vulcanizing chamber is embodies by a shell arranged at a distance from the side walls and above the furnace, which together with the latter delimits an enclosed space which communicates with the vulcanizing chamber by way of passages embodied in the lower part. The invention provides for the upper part to have at least one opening for introducing steam which communicates with the enclosed space and for the lower part to have at least one opening for extracting the steam and evacuating the condensed water.

27 Claims, 11 Drawing Sheets

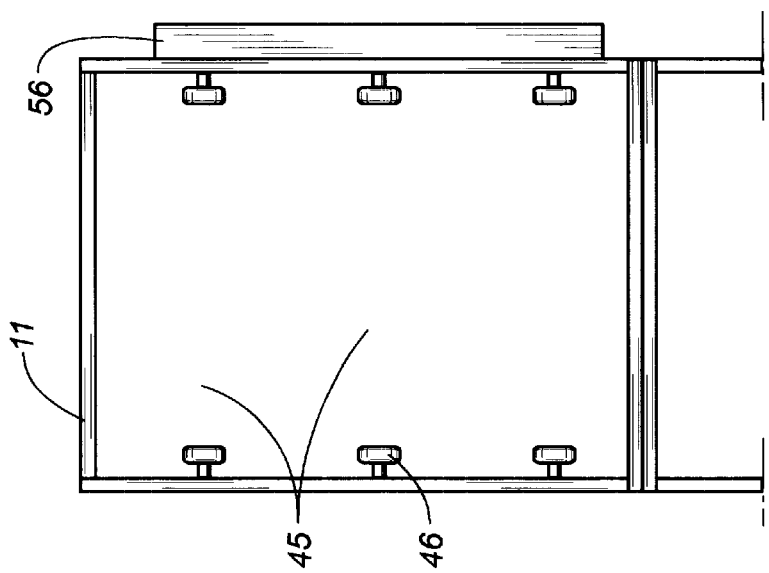
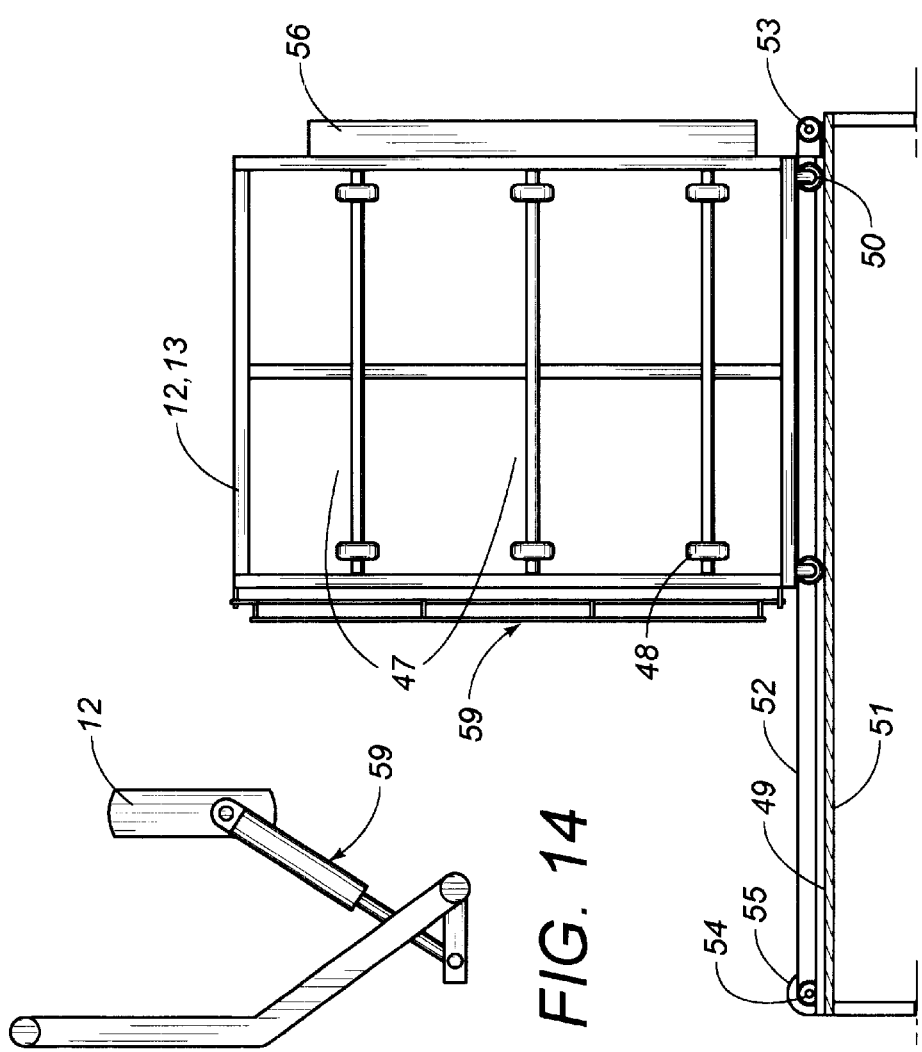

FACILITY FOR PRODUCING LATEX OBJECTS SUCH AS PILLOWS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention presented here has the object of a system for manufacturing articles made of latex having a constant or variable thickness, such as pillows, bolsters, cushions, mattresses, etc.

BACKGROUND OF THE INVENTION

A system is already known for manufacturing articles of latex foam rubber that make up a deformable wall, constructed in a closed loop that forms the molding area on the upper side, which is first dragged over itself through a latex foam rubber fitting station, then through a tunnel vulcanizer and finally, through a station for collecting the vulcanized product. Afterwards, the foam rubber band is cut into separate articles and these articles are subjected to washing and drying operations before they are packaged to be marketed.

One of the disadvantages of this system is that it does not make it possible to obtain finished articles at the output of the vulcanization tunnel. In addition, it is mainly designed for the manufacturing of objects having a constant thickness and can not be used for the manufacturing of pillows and mattresses having shapes designed to fit anatomical contours. Another disadvantage of this type of system is due to the principle of continuous manufacturing. In effect, this mode of manufacturing requires the use of an oven that is open on both ends in which it is difficult to vulcanize the products under high pressure and, for this reason, the time that the foam rubber stays in the oven is relatively long.

BRIEF SUMMARY OF THE INVENTION

The invention presented here has the goal of solving the known problems mentioned by implementing a system for manufacturing articles made of latex which allows a substantial reduction of the time the articles stay in the oven, which greatly increases the manufacturing rates.

Another goal of the present invention is to implement a system that can be used in order to manufacture articles having different shapes and sizes, of a variable or constant thickness.

For this purpose, the system according to the invention, for the manufacturing of molded articles made of latex having a constant or variable thickness, consists of molds in each of which a latex foam rubber is intended to be introduced an oven of the autoclave type, in the vulcanization chamber of which, the molds are intended to be introduced for the vulcanization of the latex foam rubber that they contain and for the formation of the articles. This system consisting moreover of a station for filling the molds with foam rubber, a station for extracting the articles from their molds, and a unit for washing and a unit for drying articles that have been removed from the mold.

The vulcanization chamber of the oven is defined by a casing that is kept at a distance from the lateral and upper walls of the oven, and installed on the lower wall of the oven. This envelope defined by the lateral and upper walls is an enclosure in communication with the vulcanization chamber by passages arranged in the lower part of the enclosure.

The enclosure is stopped off at the end.

The oven has in its upper part at least one opening for introducing water vapor under pressure and at a high temperatures and in its lower part, at least one opening for extraction of the vapor and the evacuation of condensed water. This introduction opening is in communication with the enclosure formed around the vulcanization chamber.

The vulcanization chamber consists of an opening for loading and an opening for unloading, opposing each other, each closing by a door occurs by controlled opening and closing movements.

The enclosure arranged around the vulcanization chamber allows an introduction of the vapor at high speeds into the oven for a rapid filling. This eliminates the risk that the vapor flow at the outlet of the introduction opening comes to directly hit the molds present in the chamber and arranged over its trajectory, which guarantees a uniform vulcanization.

The casing that defines the vulcanization chamber comprises a mechanism for the deflection of the flow of the vapor.

The system according to the invention is characterized in addition by the following points.

The molds are prearranged side by side by being affixed on at least one horizontal support.

The vulcanization chamber of the oven is in the form of a rectilinear tunnel.

The filling station and the station for removing the product from the mold are arranged in a manner so that one adjoins the other, they are in alignment with each other, and they are to the side of the oven.

Along the oven, opposite the unloading opening, a zone for cooling of the molds is planned.

Between the filling station and the oven, a first transfer device is planned which is designed to receive from the filling station, the assembly of the horizontal support and molds and to introduce this assembly into the vulcanization chamber of the oven by passing it through the loading opening.

The oven is equipped in the vulcanization chamber with a mechanism for positioning the assembly of the horizontal support and the molds which ensures the support of the assembly at a distance from the longitudinal, vertical, and horizontal walls of the chamber, in a manner such that the vapor during the vulcanization which occurs after closing the doors, can be divided uniformly in the chamber of the oven around the assembly of the support frame and molds.

The doors are provided with mechanisms for longitudinal centering of the assembly of the horizontal support and molds, in the vulcanization chamber of the oven before closing the doors.

Between the cooling zone and the station for removing the product from the mold, a second transfer device is planned, which is designed to receive the assembly of the horizontal support and the molds from the cooling zone and to transfer it towards the station for removing the product from the mold.

The two transfer devices and the cooling zone are each made up of a three dimensional structure provided with at least one path for guide and support, that is horizontal, rectilinear, and parallel to the longitudinal axis of the vulcanization chamber of the oven, designed to receive the assembly of the horizontal support and molds, the cooling zone being fixed and the two transfer devices being displaceable in translation on the guide rails by the motor mechanisms, between a position aligned with the filling station and a position aligned with the vulcanization chamber of the oven for the first transfer device and between a position aligned with the cooling zone and a position aligned with the station for removing the product from the mold for the second transfer device.

The transfer mechanisms and the cooling zone are equipped with mechanisms for propulsion of the assembly of the horizontal frame and the mold on their respective paths as much in the direction of the introduction of this assembly on their path as in the direction of their removal.

Thus it is possible to manufacture the articles made of latex in a quasi-continuous manner and to use an oven in which a sizeable pressure of the vapor at a high temperature can be maintained which greatly reduces the vulcanization time and increases the rates of manufacturing.

According to another characteristic of the invention, each door for blocking the vulcanization chamber of the oven is vertically mobile in slides affixed to the oven, between a low opening position of the vulcanization chamber of the oven, and a high closing position of the vulcanization chamber of the oven. It is mobilized between these two positions by at least one motor element on the control circuit of which a safety element is located which when activated, orders the activation of the motor element in the opening direction of the door. This safety element is connected to a safety plate that is unified with the door and mounted in a manner so that it is mobile in vertical translation above the upper edge of the door in a manner so that an action on this plate, directed towards the bottom, will act on the safety element and lead the door towards its opening position.

This characteristic is favorable for improving the safety and leads to the opening of the door if this door encounters an obstacle in the course of its closing movement.

According to another characteristic of the invention, the oven around each of the openings of the vulcanization chamber is equipped with a continuous groove in which an airtight seal is arranged, forming a plunger in the groove, this groove being connected to an air source that is compressed by the action of a solenoid control valve and in the closing position of the door is supplied with compressed air via the solenoid control valve which pushes back the airtight seal against the door and ensures that it is airtight at this level. This groove is in addition connected via a second solenoid control valve to a vacuum source and is connected to this source before opening the door in such a manner that under the action of the suction created, the airtight seal is completely brought back in the groove and is freed from the door.

Due to this characteristic, any defect in the flatness of the inner side of the door or imprecise positioning of the door facing the opening will be compensated by the deformation of the seal which guarantees a good airtightedness.

According to yet another characteristic of the invention, the mechanism for positioning the assembly of the horizontal support and molds in the vulcanization chamber of the oven consists of at least two vertical frames formed by the assembly of girders and crosspieces, arranged in the vulcanization chamber of the oven, one opposite the other, parallel to the longitudinal axis of the oven, against the internal vertical sides of the chamber and by at least one horizontal path for guiding and support of the assembly of the horizontal support and molds, unified with two frames and stretching from one of the openings to the other, the path being arranged completely in the space between the frames in a manner so that the vapor passages are arranged between the path and the lateral vertical sides of the vulcanization chamber of the oven.

This device allows an equal dividing of the vapor in the oven as much above as below the horizontal support assembly and does not require vapor intakes at different levels.

According to another characteristic of the invention, the filling station comprises a horizontal container having a U-shaped cross section, open at one end and comprising along its longitudinal axis, between its vertical wings, a horizontal guide and support path of the assembly of the horizontal support and molds. This guide path is open at one end and the guide path and the guide paths of the transfer devices of the cooling zone and the vulcanization chamber of the oven is coplanar.

The arrangement of the filling device in a container allows, during filling, the recovery of the surplus of the foam rubber while the coplanar arrangement allows the easy passage of the assembly of the horizontal support and molds towards the first transfer device.

According to another characteristic of the invention, the station for removing the product from the mold is equipped with two vertical longitudinal wings set at a distance from each other between which a guide and support path of a support assembly and molds is arranged, this guide path being open at the end, the guide path and the guide paths of the transfer devices, of the filling station, of the cooling zone and the vulcanization chamber of the oven being coplanar, the guide path being arranged in alignment with the guide path of the filling station.

This coplanar arrangement makes it easier to transfer the assembly of the horizontal support and molds from one guide path to the other.

According to another characteristic of the invention, the vulcanization chamber of the oven is equipped with several guide and support paths arranged according to several levels of height in order to simultaneously receive several assemblies of horizontal support and molds. In addition, at each of these levels of height, the transfer devices and the cooling zone each contains a guide and support path of an assembly for horizontal support and molds and the filling and mold removal stations are each mobile in vertical translation between the different levels of the height under the action of a motor mechanism that is appropriate for them, this motor mechanism ensuring on the other hand their positioning at the height according to the level of height selected.

This device increases in a notable way the rates of manufacturing and best uses the capacity of the oven.

According to another characteristic of the invention, the washing unit is made of two sets of at least two pressing elements, mounted one above the other, in order to define a channel for pressing and expanding the product, containing one intake for products and one outlet for products, these pressing elements being led in rotation on themselves by a motor mechanism in order to lead the products into the channel from the intake of the channel to the outlet. The pressing elements of each set are arranged straight across from the pressing elements of the other and the pressing elements of each set are set at a distance from each other so as to make a space between them in which the molded article can become dilated, the washing unit, being equipped in addition with a mechanism for the injection of a liquid agent in the known space defined in a manner such that the latex article can be loaded with liquid washing agent during its expansion in the space.

By successive compressions of latex articles, the unit for washing plus cleaning in depth of the articles creates a dimensional stabilization of these articles.

According to another characteristic of the invention, the drying unit is made of two sets of at least two pressing elements, mounted one above the other, in order to define a channel for pressing and dilation of the products, containing a product intake and a product outlet from the washing unit, the pressing elements being led in rotation on themselves by a motor mechanism in order to lead the products into the channel, the pressing elements of each set being arranged straight across from the pressing elements of the other and the pressing elements of each set being set at a distance from each other so as to make a space between them in which the hot and dry air is introduced by a mechanism for injection so as to dry the products.

The introduction of the hot air into the space in which the product dilates allows an introduction of this air into the mass of the product and creates a drying all the way through. The air loaded with humidity will be forced out of the mass of the product during the subsequent compression of it.

BRIEF DESCRIPTION OF THE SEVERAL VIEWS OF THE DRAWINGS

Other advantages and goals and characteristics of the invention appear in reading the description of a preferred embodiment form given as a non-restrictive example in referring to the attached drawings.

FIG. 12 is a cross-section view of a transfer device.

FIG. 13 is a cross-section view of the cooling zone.

FIG. 14 is a detail view showing the pressing assembly that equips the first transfer device, in the inactive position.

DETAILED DESCRIPTION OF THE INVENTION

Figure 1:
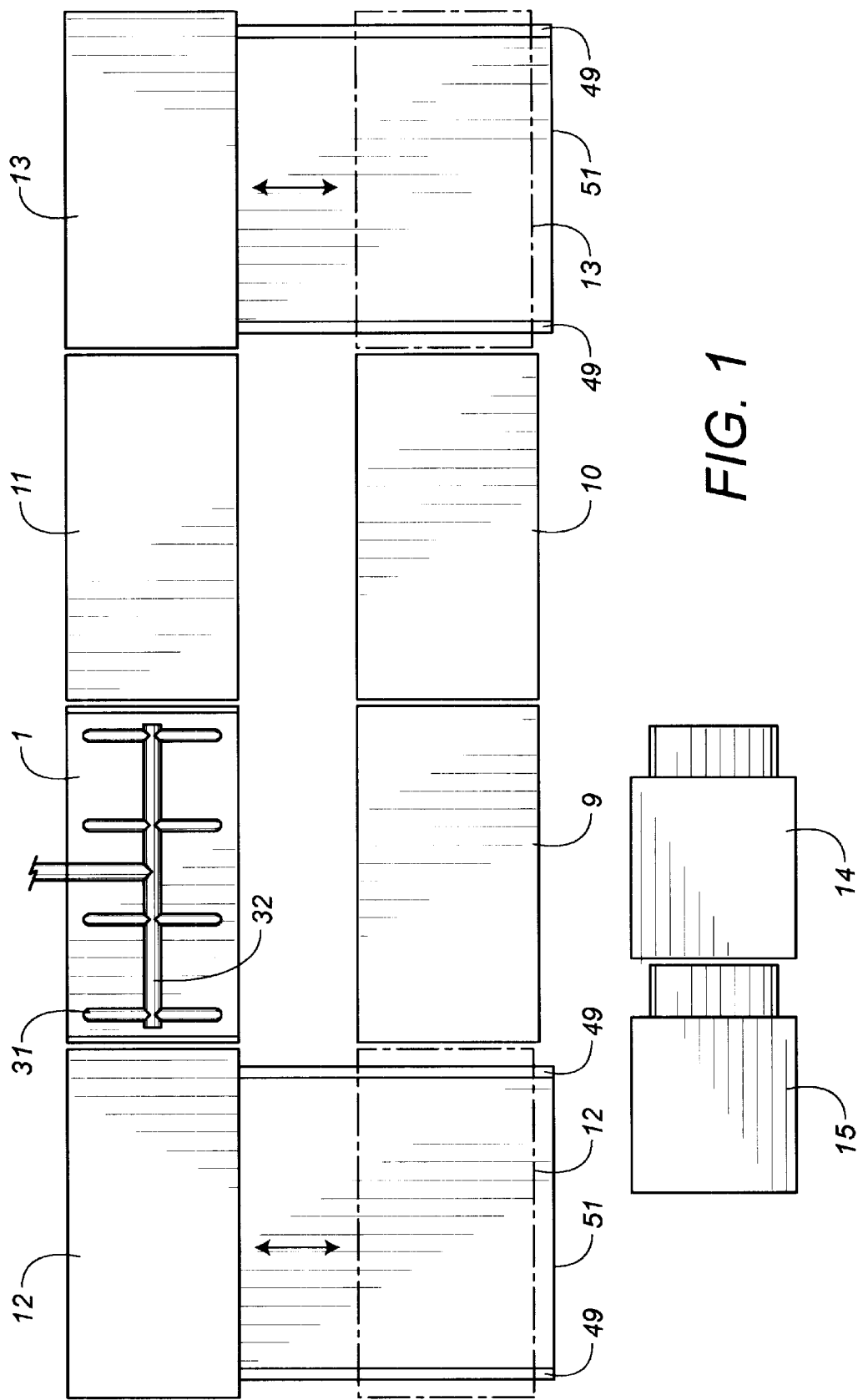
FIG. 1 is a top view of a system according to the invention.
Figure 2:
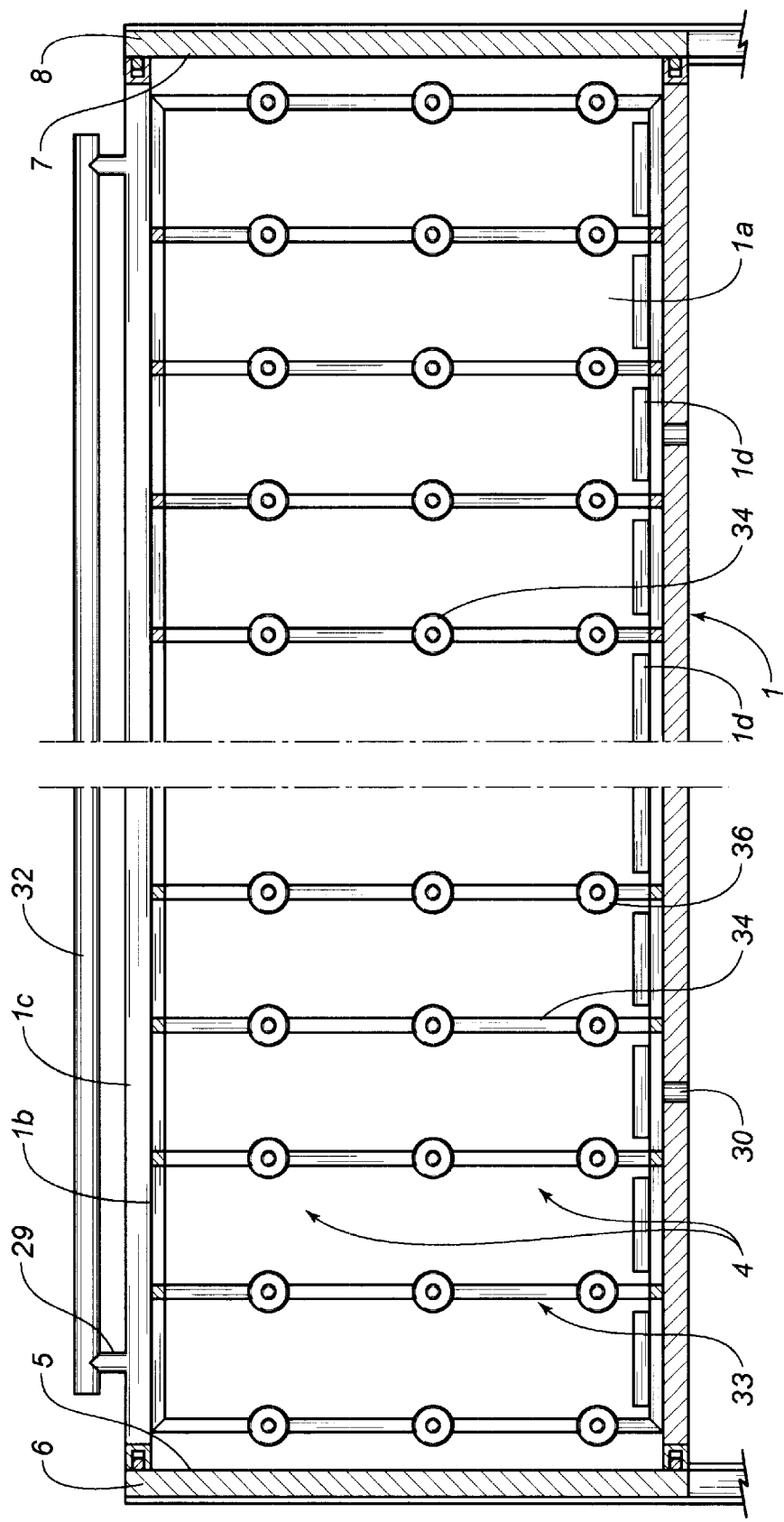
FIG. 2 is a view in a longitudinal section of the oven for the system according to the invention.
Figure 3:
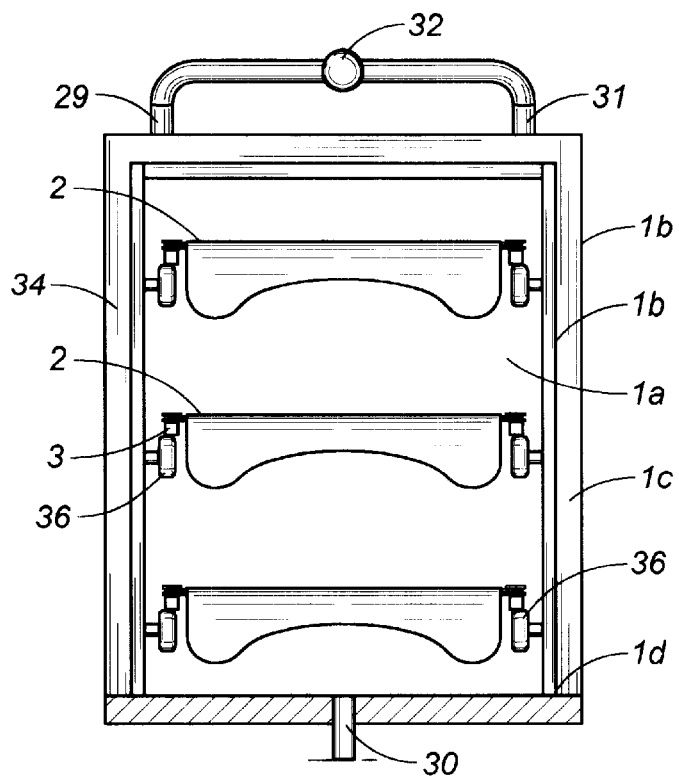
FIG. 3 is a cross-section of the oven.
Figure 4:
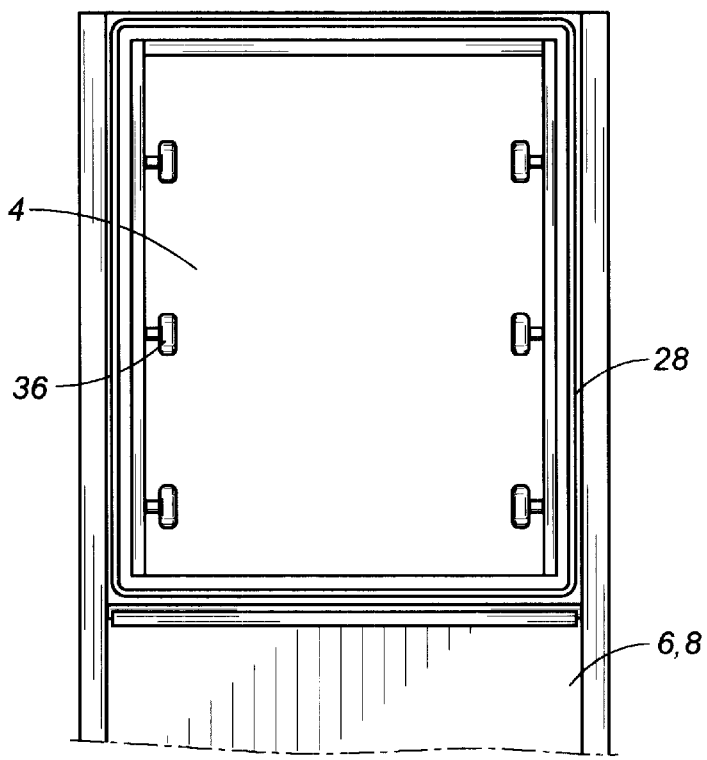
FIG. 4 is a front view of the oven.
Figure 5:
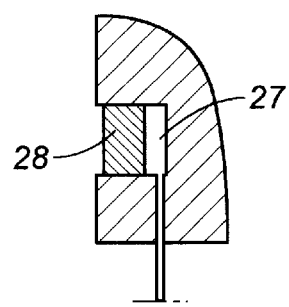
FIG. 5 is a sectional view of the continuous groove and the airtight seal that are fitted in the oven.
Figure 6:
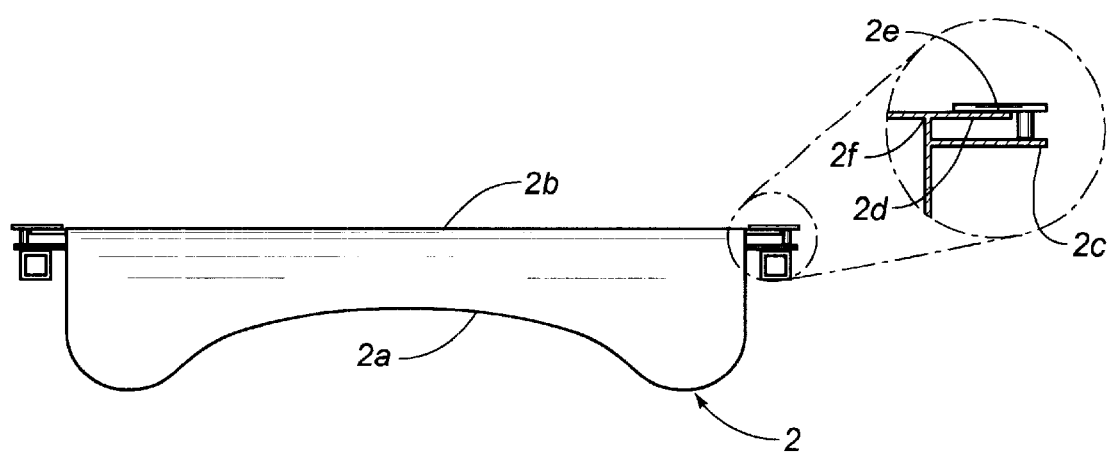
FIG. 6 is a sectional view of the mold of the system according to the invention.
Figure 7:
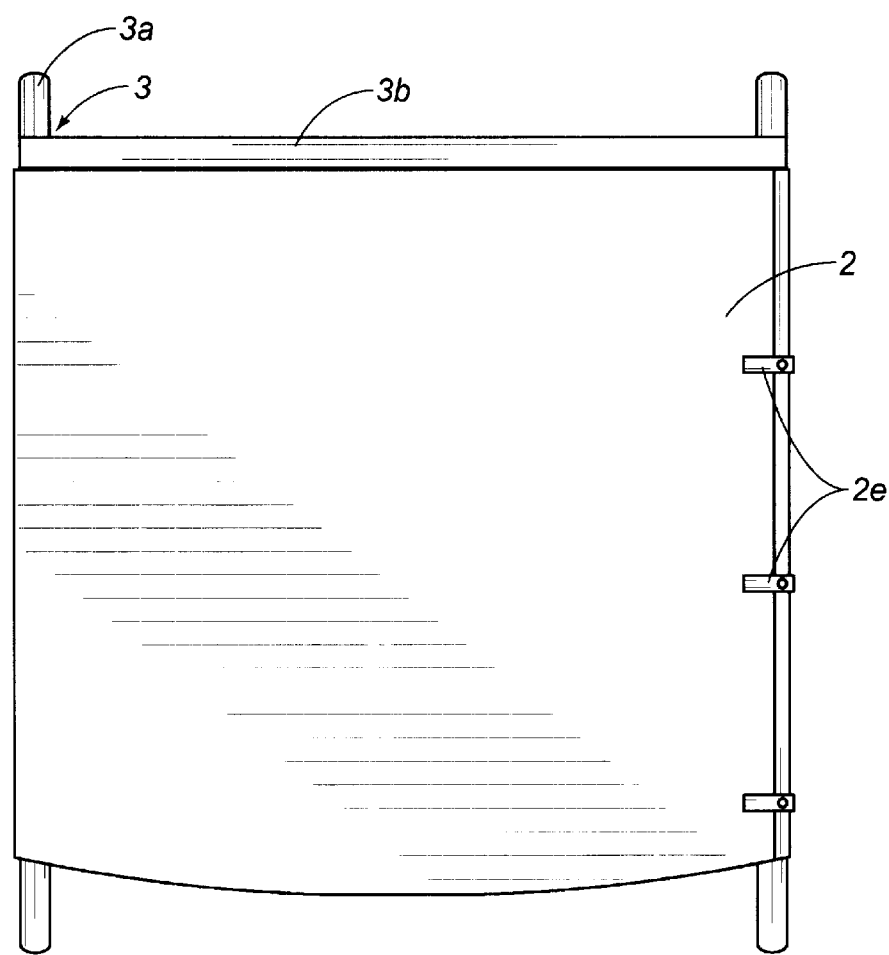
FIG. 7 is a partial bottom view of an assembly of horizontal support and molds.
Figure 8:
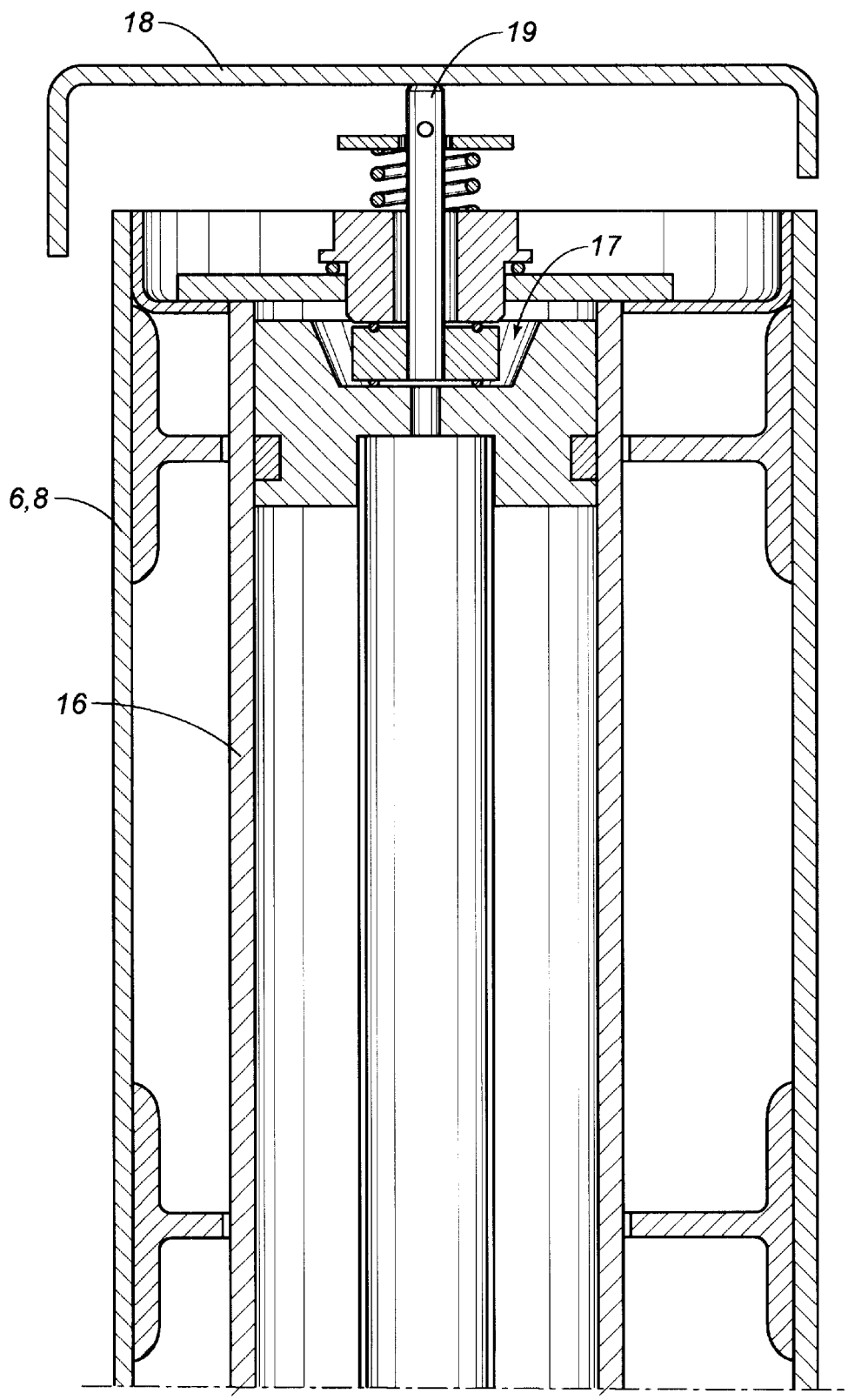
FIG. 8 is a partial longitudinal section view of one of the doors of the oven.
Figure 9:
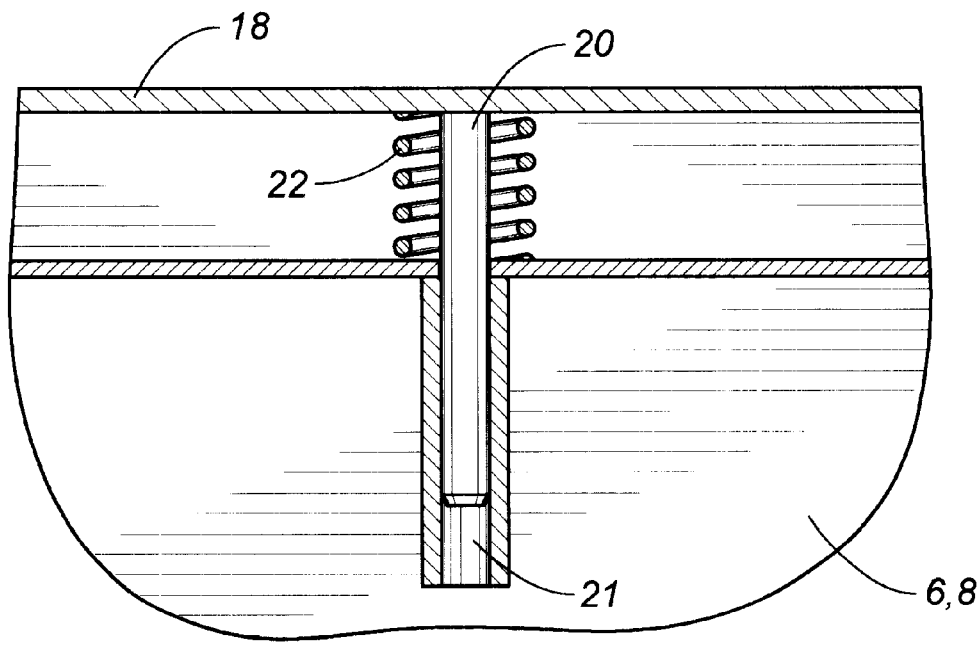
FIG. 9 is a partial section view of the safety plate that is fitted to each door of the oven.
Figure 10:
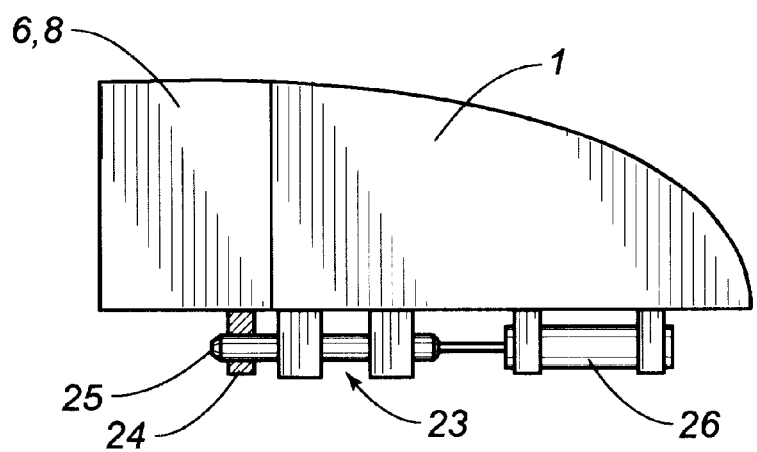
FIG. 10 is a detail view showing the mechanisms for locking each door of the oven in the closed position.
Figure 11:
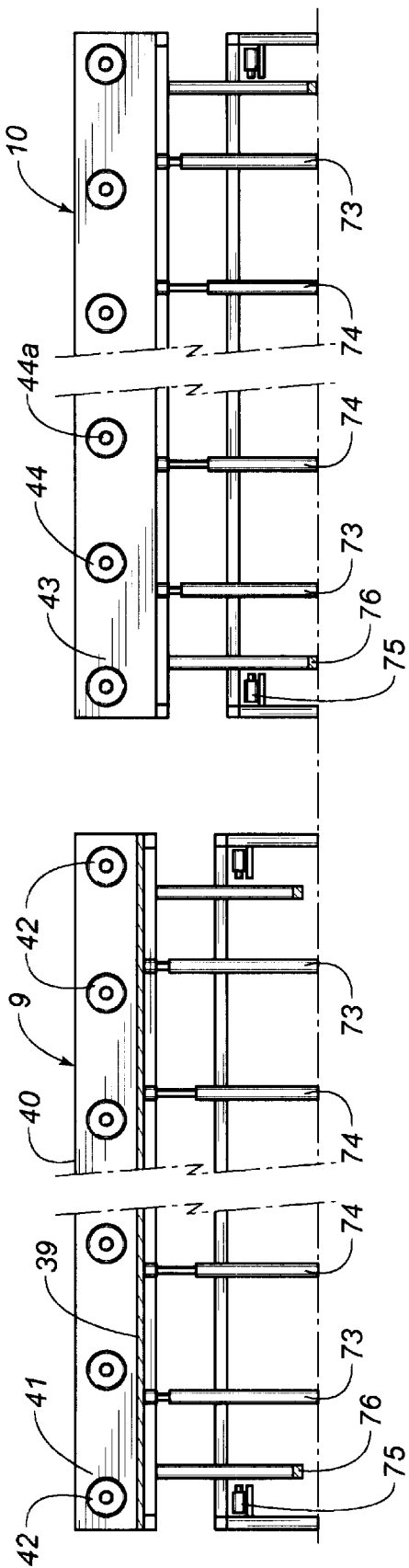
FIG. 11 is a section view of the stations for molding and removing the mold of the system according to the invention.
Figure 16:
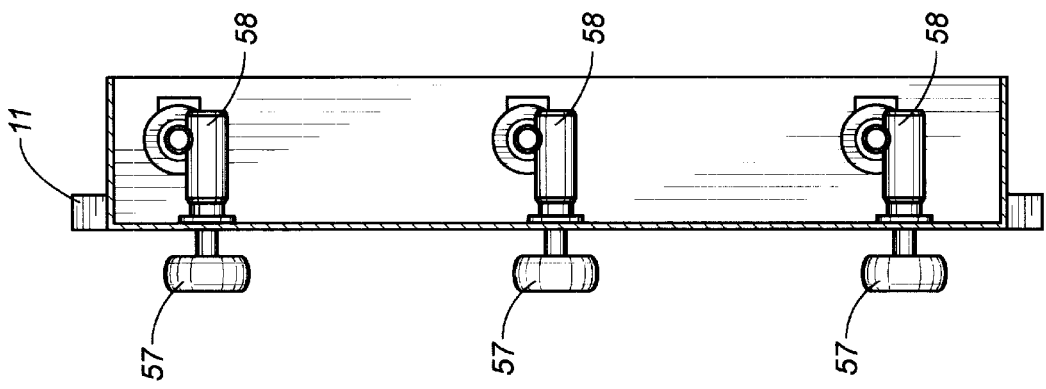
FIGS. 15 and 16 show the propulsion mechanisms that equip the transfer devices and the cooling zone.
Figure 15:
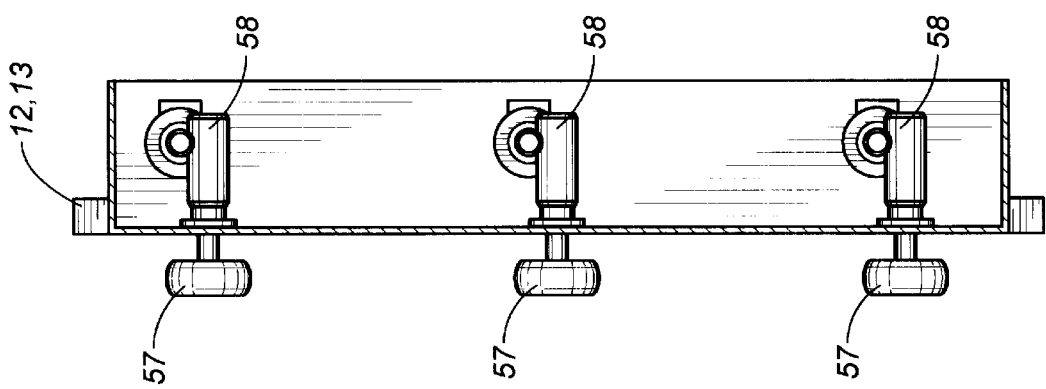
Figure 18:
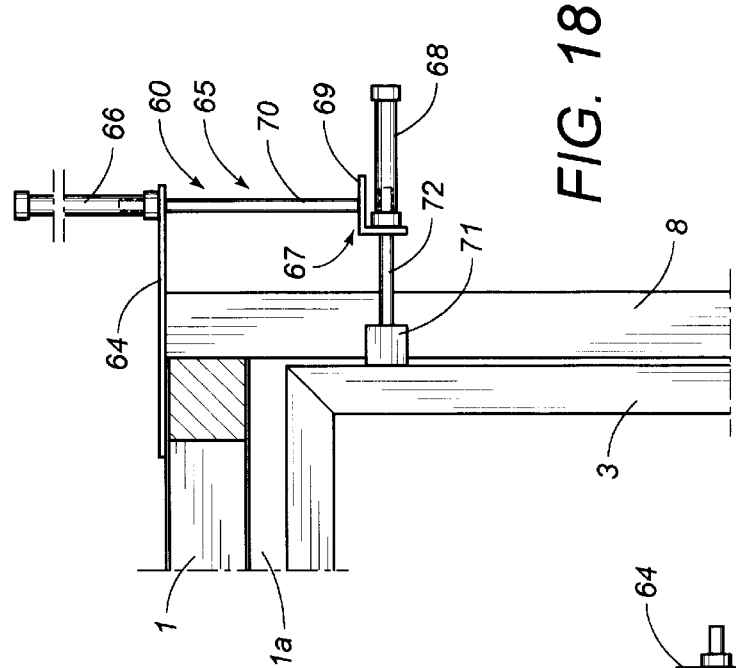
FIG. 18 is a top view, of detail showing the assembly of the stopper that equips the oven.
Figure 19:
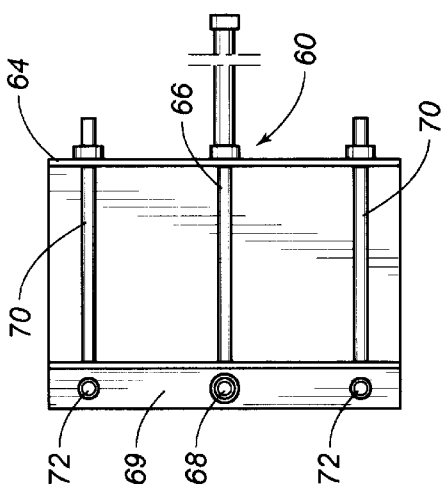
FIG. 19 is a front view, showing the assembly of the stopper that equips the oven.
Figure 17:
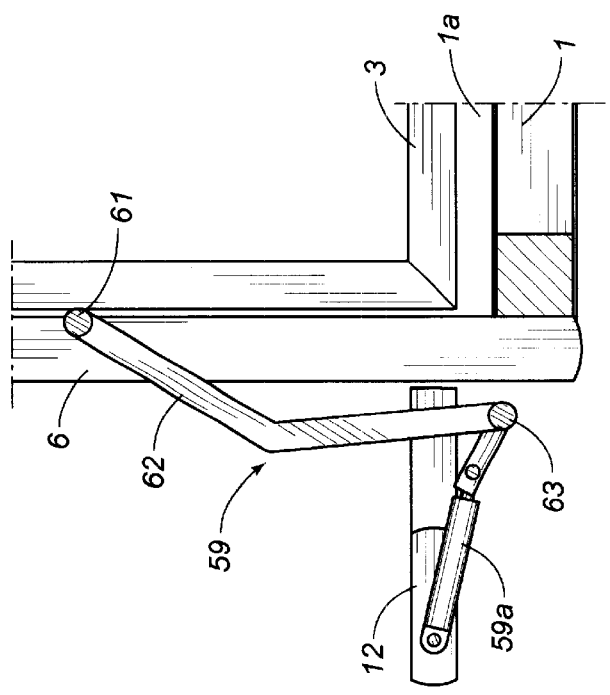
FIG. 17 is a top view, of the detail showing the pressing assembly that equips the first transfer device, in the active position.
Figure 20:
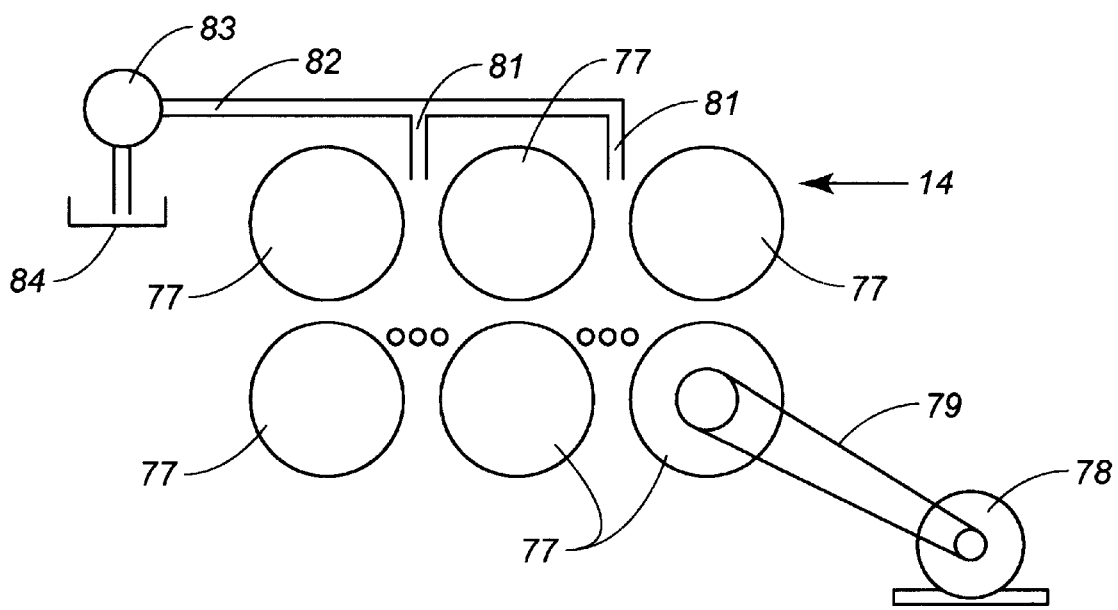
FIGS. 20 and 21 are respectively the schematic views of the washing unit and the drying unit.
Figure 21:
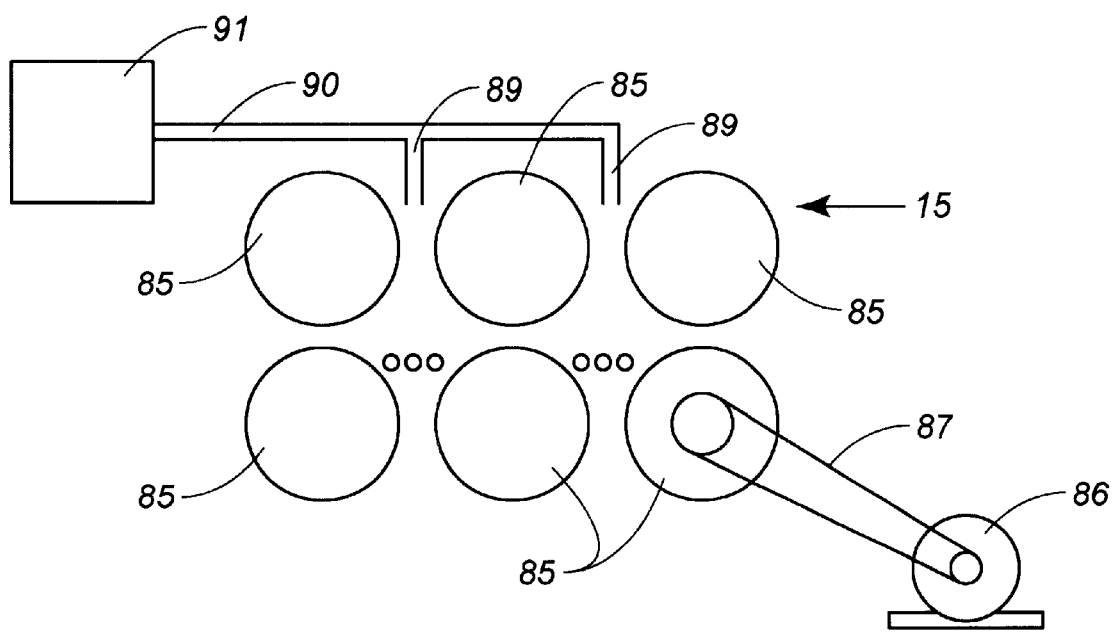

As shown, the system for manufacturing articles molded from latex foam rubber consists of an oven 1 of the autoclave type, in the vulcanization chamber of which, vapor under relatively high temperature and pressure is introduced to vulcanize the latex mold arranged in the molds 2 that are carried by a horizontal support 3 that is detachable and rests in the vulcanization chamber of the oven 1 on a path 4 for the horizontal guiding and support, extending between an introduction opening 5 that can be blocked by a first mobile door 6 and an unloading opening 7 set opposite the introduction opening 5, which can be blocked by a second mobile door 8, where these openings for loading 5 and unloading 7 are perpendicular to the longitudinal axis of the vulcanization chamber of the oven. The system further comprises, adjacent to the oven 1, a filling station 9 of the molds 2 made of latex foam rubber. In extension from the filling station 9, a station 10 for removing the articles from their molds 2 is arranged, these two stations 9, 10 being axially aligned and extending in parallel to the longitudinal axis of the oven 1. In alignment with the oven 1, relative to the unloading opening 7, the system is equipped with a cooling zone 11. This cooling zone 11 is to the side of the mold removal station 10. The system between the filling station 9 and the oven 1 consists of a first transfer device 12 designed to receive from this filling station 9 the assembly of the horizontal support 3 and molds 2 and introduce this assembly into the vulcanization chamber of the oven 1 by passing through the loading opening 5. Between the cooling zone 11 and the mold removal station 10, the system is provided with a second transfer device 13 designed to receive from the cooling zone 11, the assembly of the horizontal support 3 and molds 2 and to transfer it towards the mold removal station 10. The advancing of the support assembly 3 and molds 2 in the system is the following. After filling the molds 2 with latex foam rubber at the stage of the filling station, the assembly of the support 3 and molds 2 is introduced into the first transfer device 12 that is previously positioned in alignment with the filling station 9. Afterwards, the transfer device 12 is led along the vulcanization chamber 1a of the oven 1, relative to the introduction opening 5 and after opening the door 6, the assembly of the support 3 and molds 2 is introduced into the chamber so that the latex foam rubber undergoes vulcanization there. After firing the articles, the door 8 connected to the unloading opening 7, is opened and the assembly of the horizontal support 3 and molds 2 is introduced into the cooling zone 11 where it stays for a few minutes. Afterwards, the assembly of the horizontal support 3 and molds 2 is introduced into the second transfer device 13, previously positioned along the cooling zone 11. This second transfer device 13 is then led into the mold removal station 10 and the assembly for horizontal support 3 and molds 2 is introduced into the station. After removal of the mold, the articles are introduced into a washing unit 14 and then into a drying unit 15 and the assembly of the horizontal support 3 and molds 2 is introduced into the filling station 9 so that the molds 2 are filled again with latex foam rubber. Several assemblies of the horizontal support and molds are used and are arranged in the system one after the other in a manner so that the mold removal operations, the filling, vulcanization, and cooling take place simultaneously.

The vulcanization chamber 1a has a parallelopiped shape and extends in a rectilinear manner between the loading opening 7 and unloading opening 5. These openings 5 and 7 are perpendicular to the longitudinal axis of the chamber 1a. The vulcanization chamber 1a is defined in the oven by a casing 1b mounted on the lower wall of the oven and set at a distance from the upper and side walls of the oven. This casing defines within the oven an enclosure 1c surrounding the vulcanization chamber along three sides. The enclosure 1c, preferably straight across from the openings 5 and 7, is blocked at the end by two walls affixed firstly to the walls of the oven and secondly, to the casing 1b.

According to the preferred embodiment form, each door 6, 8 for blocking the openings 5 and 7 of the vulcanization chamber 1a of the oven 1 is vertically mobile between a low opening position of the vulcanization chamber of the oven and a high position for closing the oven in the vertical slides of the U-shaped cross-section, arranged on both sides of the corresponding opening. These slides are positioned one relative to the other so that their entrances are turned towards each other. The door, along its lateral vertical edges, is provided with sliding runners secured so as to come to slide against the bottom slide.

The door 6, 8 is moved between the opening position and the closing position by at least one motor element 16 on the control circuit of which a safety element 17 is arranged, which, when it is activated, controls the activation of the motor element 16 in the opening direction of the door 6, 8. Preferably, this safety element 17 is connected to a safety plate 18, for activation, connected with the door and mounted in a manner so that it is mobile in vertical translation above the upper edge of the door so that an action on this plate directed towards the bottom, during the closing movement of the door, leads to activate the safety element and to reverse the direction of movement of the door which puts it into an opening position.

Preferably, the motor element 16 is made of a pneumatic power cylinder that is united by its shaft with the structure of the oven and by its body to the door of the oven. This power cylinder, by its body being introduced into a vertical housing made in the door, has a lower opening in the lower edge of the door for the passage of the power cylinder body and an upper opening in the upper edge of the door, at the level of which the safety element 17 is positioned, which consists of a valve with an activation shaft 19, connected to rear chamber of the power cylinder. This valve, when it is activated, i.e. when its activation shaft 19 is pushed into the body and the stopcock is brought out of the seat, puts this rear chamber at overflow. In the embodiment form chosen, the valve is screwed into a tapped hole, made in the end wall of the rear chamber of the power cylinder. The activation shaft 19 of the valve is positioned under the safety plate 18 so that it is activated by the plate. The safety plate 18 is mounted above the upper edge of the door 6, 8 and contains affixed to its lower side two vertical guide shafts 20 designed to come to act together in guiding with two bore holes 21 made in the door from the upper edge of the door. Around each guide shaft, a spiral return spring 22 is mounted. Preferably, the safety plate 17 is equipped with two lateral vertical wings that extend towards the base in order to mask the upper part of the door 6, 8.

Each door is connected to at least one locking mechanism 23 which ensures the locking of its closed position. This mechanism is made firstly of a vertical bracket with a bore hole 24, united with the structure of the door and secondly, with a cylindrical key 25 united with the structure of the oven activated by a motor element 26 between a withdrawn position by which it is set off at a distance from the bracket 24 and a locking position by which it is engaged in the bore hole of the bracket 24. The key 25 is mounted in sliding in two support guides set at a distance from each other and affixed to the oven. Preferably, the motor element 26 is made of a pneumatic power cylinder. This power cylinder is affixed by its body to the structure of the oven. The key 25 is affixed to the shaft of the power cylinder.

In order to ensure the air-tightedness of the vulcanization chamber after closing the doors 6, 8, the oven is equipped around each of the openings of the vulcanization chamber, in the end walls for blocking off the enclosure 1c, with a continuous groove 27 in which an air-tight seal 28 is arranged. This seal forms a plunger in the groove 27 and this groove is connected to a source of compressed air, not shown, by the use of a solenoid control valve, not shown, and in a position of closing of the door is supplied with compressed air via the solenoid control valve which pushes back the airtight seal against the door and ensures the air-tightedness at this level.

The groove will be connected via a second solenoid control valve, not shown, to a vacuum source, not shown, and is connected to this source before opening the door 6, 8 so that under the action of the vacuum extraction created, the airtight seal 28 is brought back completely in the groove 27 and is brought out of the door.

The vulcanization chamber 1a of the oven consists of several vapor inputs 29 arranged in the upper wall of the oven 1 and coming in communication with the enclosure 1c and several outputs 30 of vapor and condensed water, made in the lower wall of the oven, the enclosure 1c being in communication with the chamber 1a by the passages 1d made in the lower part of the casing 1c. The vapor inputs 29 are arranged at a regular intervals and consist of bore holes that go through in the upper wall at a regular interval one from the other and the direction of the length of the wall. The drill holes that go through can receive a jacketing and are each, in communication with a secondary conduit 31 for supplying the vapor, connected to a main conduit 32 for supplying the vapor, the conduit being connected to a vapor generator, not shown. The vapor generator emits the vapor under relatively high temperature and pressure and is controlled by the appropriate mechanisms so that it is possible to also adjust the value of the vapor pressure and the value of the temperature.

The oven 1, in the vulcanization chamber 1a, is equipped with a positioning mechanism 33 of the assembly for horizontal support 3 and molds 2 that ensures the support of this assembly at a distance from the longitudinal vertical and horizontal walls of this chamber. In this manner, the vapor can be uniformly distributed in the chamber of the oven around the assembly for horizontal support and molds 2 which is a guarantee of the uniform vulcanization of the articles.

Preferably, the positioning mechanism 33 is made of at least two vertical frames 34 formed by the assembly of girders and traverses, arranged in the vulcanization chamber of the oven relative to each other, parallel to the longitudinal axis of the oven, against the internal vertical sides of the chamber, i.e. against the internal lateral sides of the casing 1b and by at least one horizontal guide and support path 4 of the assembly for horizontal support 3 and molds 2, united with the two frames 34 and extending from one of the two openings 5, 7 to the other. This path 4 is formed completely in the space between the frames 34 in order to arrange a passage of the vapor between the path and the lateral vertical sides of the vulcanization chamber of the oven. The frames 34 are kept at a distance from each other by the cross-struts affixed to their upper girders.

The guide and support path 4 is made of two sets of rollers 36 having the same diameter, arranged opposite each other at a distance from each other, the rollers 36 being mounted at idle, overhanging, on the horizontal axles perpendicular to the longitudinal axle of the guide path, the axles being fixed by their end near to the traverses of the frames of the positioning mechanism and being arranged along a same horizontal geometrical plane.

The molds are prearranged side by side affixed on the horizontal support. Each mold 2 is made of a lower element of the mold 2a, forming a recess, and an upper element of the mold 2b designed to cover the lower element and to form with this element a molding cavity in which, by passing through a drill hole for filling arranged in the wall of the upper element, the latex foam rubber is introduced at the level of the molding station. Advantageously, the drill hole for filling is equipped with a nonreturn valve designed to prevent the foam rubber from being forced back to the outside of the mold. The upper element is equipped with drill holes which make up vents.

The two elements of the mold form a peripheral seat 2c, 2d. The peripheral seat of the lower element is larger than the peripheral seat of the upper element. The mold is supported by the seat of the lower element on the horizontal support. In the embodiment form selected, the upper element and the lower element are adjustable relative to each other by the joints. In addition, the mold 2 is provided with locking elements 2e of two elements 2a, 2b in a position of being pulled down on each other in a manner so as to avoid, during vulcanization, elements from becoming set apart at a distance from each other under the action of the expansion of the latex mold. These locking instruments are arranged on the peripheral seat of the lower element, opposite the joints. Advantageously, each locking instrument consists of a latch, mounted in articulation on the peripheral seat of the lower element and having a locking position to go into the seat of the upper element.

According to a preferred embodiment form, the lower element of the mold 2a, projecting relative to its peripheral seat, is equipped with a continuous wall 2f having a lower thickness forming the upper part of the mold cavity. The upper edge of this continuous wall 2f is arranged along the plane of the seal. Against this upper edge, the upper element 2b is pulled down to close the mold 2. During the introduction of the latex foam rubber into the mold and during vulcanization, it sometimes occurs that low quantities of foam rubber are expelled by passing through the gaps between the continuous wall 2f and the upper element 2b. This type of disadvantage creates mold seams afterwards that should be eliminated. Usually, these mold seams are taken off after the product is removed from the mold and the operation of deflashing in this case requires the use of an additional person which increases the cost price. In addition, the deflashing operation is often done using chisels or other sharp-edged tools which does not give the product a finished look. Due to the presence of the continuous wall 2f, which has a low thickness and due to the use of an element fitted to cut the mold seams, the operation of deflashing the product can then be done before the product is taken out of the mold in simply exerting a shearing force on the mold seam.

The horizontal support 3 is made up of a frame formed by two girders 3a joined to several traverses 3b that define successively with the girders, cells in which the molds 2 are arranged, which rest on two sides opposite the peripheral seat of the lower element 2a on the two support girders. The lower element of the mold can be provided with at least one element in the form of a fork designed to be arranged around one of the girders in order to ensure the positioning of the mold relative to the support.

The filling station 9 is mounted on a carrying structure and is made up of a horizontal container 39 having a U-shaped cross-section, open at the end and consisting along its longitudinal axis, between its vertical wings 40, of a horizontal guide and support path 41 of the assembly for horizontal support 3 and molds 2, this guide path being open at the end.

The guide path 41 is made up of two sets of rollers having the same diameter, arranged opposite each other at a distance from each other, one of which is carried by one of the vertical wings 30 of the container and the other set by the other wing, each roller of each set being mounted at idle, overhanging, on a horizontal axle perpendicular to the longitudinal axle of the guide path 41, this axle being fixed by its end near to the corresponding wing.

The station 10 for removing the product from the mold is mounted on a carrying structure and is made of two vertical longitudinal wings 43, set at a distance from each other between which a guide and support path 44 of the assembly for horizontal support and molds is arranged, open at an end, this guide path and the guide path 41 of the filling station 9 being coplanar and arranged in alignment with each other.

The guide path 44 is made up of two sets of rollers 44a having the same diameter arranged opposite each other at a distance from each other, one of which is carried by one of the vertical wings 43 of the station for removing the product from the mold, and the other set by the other wing, each roller 45 of each set being mounted at idle, overhanging, on a horizontal axle perpendicular to the longitudinal axle of the guide path. This axle is fixed by its end near to the corresponding wing 43.

In order to make it easier to open the molds at the stage of the station for removing the product from the mold, the upper element of each mold is equipped with a grasping mechanism such as a hook and at the stage of the station for removing the product from the mold, a hoist is provided that is mounted on a traction arm articulated on a structure and connected to a motor swiveling activation mechanism. The hoist is made of several hooks to which instruments for grasping the molds are affixed. After hooking the grasping instruments to the hoist and pivoting towards the rear of the traction arm, the opening of the molds is obtained.

The cooling zone 11, installed opposite of the unloading opening 7 of the vulcanization chamber 1a of the oven 1, is made up of a three-dimensional structure defining a parallelopiped volume. This structure is formed by assembling the horizontal girders parallel to the axis of the oven, the horizontal perpendicular traverses to the girders and regularly spaced vertical columns, to which is affixed, in the parallelopiped volume formed, at least one guide and support path 45, horizontal, rectilinear, arranged in alignment with the longitudinal axis of the vulcanization chamber, open at the two ends and designed to receive the vulcanization chamber, an assembly for horizontal support 3 and molds 2. The guide path 45 of the cooling zone 11 is made up of two sets of rollers 46 having the same diameter, arranged opposite each other, at a distance from each other, these rollers being mounted at idle, overhanging, on the horizontal axes perpendicular to the longitudinal axis of the guide path, where the axes are fixed by their end near to the structure of the cooling zone and more precisely, to the vertical columns and are arranged along a same horizontal geometrical plane.

The two transfer devices 12, 13 are each made of a three-dimensional structure, defining a parallelopiped volume. This structure is formed by assembling the horizontal girders parallel to the longitudinal axis of the vulcanization chamber of the oven, the horizontal traverses perpendicular to the girders and the vertical columns regularly spaced, to which is fixed, in the parallelopiped volume formed, at least one guide and support path 47, horizontal, rectilinear, parallel to the longitudinal axis of the vulcanization chamber of the oven. The guide path 47 of each transfer device 12, 13 is made up of two sets of rollers 48 having the same diameter, arranged opposite one another at a distance from each other, these rollers 48 being mounted at idle, overhanging, on the horizontal axes perpendicular to the longitudinal axis of the guide path, the axes being affixed by their end near to the structure of the transfer device and being arranged along a same geometrical horizontal plane.

Each transfer device 12, 13 can be displaced in translation on the guide rails 49 by the motor mechanisms, between a position aligned with the filling station 9 and a position aligned with the vulcanization chamber of the oven 1 for the first transfer device 12 and a position aligned with the cooling zone 11 and a position aligned with the mold removal station 10 for the second transfer device. Preferably, each transfer device 12, 13 is carried by the bearing instruments 50 that go into the guide rails 49. These guide rails are carried by a table 51 and are each made up of a profile having a U-shaped cross-section. These guide rails 49 are perpendicular to the longitudinal axis of the guide path 47 of each transfer device.

The motor mechanisms ensure the displacement in translation of each transfer device consisting of a timing belt 52 held between a notched driving pulley 53 mounted in a case united with the table 51, and a notched driving pulley 54 coupled to the output shaft of an electric motor 54 mounted affix ed on the table 51. The transfer device is affixed by its structure by any known means to the upper side of the timing belt.

The cooling zone 11 and each transfer device 12 and 13 are each equipped with a propulsion mechanism 56 of the assembly for horizontal support 3 and molds 2 on the guide path both in the direction of the introduction and direction of extraction. The propulsion mechanism 56 of the cooling 7 one is arranged at the stage of the end of the guide path corresponding to the opening 7 of the vulcanization chamber 1a. The propulsion mechanism 56 of the first transfer device 12 is located at the level of the nearest end of the guide path 47, the nearest end of this path being defined like the one coming by comparison from the loading opening 5 of the vulcanization chamber and by comparison from the filling station 9. The propulsion mechanism 56 of the second transfer device 13 is located at the level of the nearest end of the guide path 47 of this device, the near end of this path being defined as the one coming by comparison from the cooling zone 11 and by comparison from the station for removing the mold 10.

Each propulsion mechanism 56 is made up of at least one roller 57 tangent to the guide path, coupled to the output shaft of a motor element 58, such as an electric motor, affixed to a chassis, in the form of case, unified with the structure of the transfer device or the cooling zone, this roller 57 being perpendicular, by its rotational axis, to the corresponding guide path and coming under pressure against one of the girders of the support element so that by rotation around its axis, it forms on the support element a translation movement on the guide path.

The longitudinal centering mechanisms of the assembly of the horizontal support and molds, in the vulcanization chamber 1a of the oven 1 before closing the doors 6, 8, consist of a pressing assembly 59, united with the front end of the first transfer device 12 and a stopper assembly 60, united with the oven and arranged in a manner adjoining the unloading opening, these pressing elements 59 and stopper elements 60 each being activated by at least one motor mechanism between a withdrawn position according to which they are let out of the trajectory of the assembly for horizontal support and molds, and an active position according to which they are secant to this trajectory and arranged in the vulcanization chamber of the oven at a distance from the openings 6, 7 in a manner to withdraw the support assembly 3 and molds 2 from the trajectory of the doors 6 and 8, the pressing element 59 being activated after the assembly for horizontal support and molds has left the rails of the transfer device in order to come to act by pressing on the rear end of the horizontal support and to cause the front end of this support to stop against the element of the stopper previously arranged according to its active position.

The pressing assembly 59 is made up of a vertical bar 61 mounted at the end of an arm structure 62 affixed to a vertical shaft 63 mounted free in rotation and fixed in translation in the bearings of the structure of the first transfer mechanism, the shaft 63 being coupled to the motor mechanism 59a of the pressing assembly, made of a pneumatic power cylinder articulated by its body to the structure of the transfer device and by its shaft at the end of a radial tab affixed to the vertical shaft 63. The pneumatic power cylinder is connected through a solenoid control valve to a source of compressed air. By the activation of the shaft of the power cylinder under the effect of the pressure of the compressed air introduced into the rear chamber of the power cylinder, the pivoting movement of the pressing assembly is caused in the direction of a pressure directed towards the vulcanization chamber.

The stopper assembly 60 consists of a vertical plate 64, for support, united with one of the lateral vertical blanks of the oven and parallel to the blanks carrying a first stopper element 65 that is mobile under the action of a first motor element 66 parallel to the unloading opening 7 of the vulcanization chamber of the oven, between a withdrawn position according to which it is arranged in lateral withdrawal opposite the trajectory of the assembly for horizontal support 3 and molds 2 and an activation position according to which it is secant to the trajectory, the first element of the stopper supporting a second stopper element 67 that is mobile in translation, under the action of a second motor element 68, in a manner perpendicular to the opening of the vulcanization chamber of the oven, between a position of withdrawal according to which it is outside of the vulcanization chamber and in front of the unloading opening and a position of activation according to which it is in the vulcanization chamber of the oven behind the opening.

According to the preferred embodiment form, the first stopper element 65 consists of a vertical plate 69 provided with two wings of which the first is perpendicular to the plane of the unloading opening and the second is parallel to this opening and carries the second stopper element 67, two horizontal guide slides 70, parallel to the unloading opening 7, arranged one above the other, each affixed by one of their ends to the first wing of the plate 69 and going in sliding into the two guide bearings in fixed translation to the plate 64, a pneumatic power cylinder that makes up the first motor element 66, this power cylinder extending horizontally between the support plate 64 and the first wing of the plate 69 and being fixed by its body to the support plate 64 and by its shaft to the first wing of the plate 69. Always depending on the preferred embodiment form, the second stopper element 67 consists of a vertical stopper bar 71, two horizontal guide slides, perpendicular to the unloading opening 7, arranged one above the other, each affixed by one of their ends to the stopper bar 71 and sliding into two guide bearings fixed in translation to the second wing of the plate 69 of the first element 65, a pneumatic power cylinder comprising the second motor element 68, the power cylinder extending horizontally between the stopper bar 71 and the second wing of the plate 69 of the first element 65 and being affixed by its body to the second wing and by its shaft to the stopper bar.

According to the preferred embodiment form, the vulcanization chamber 1a of the oven is equipped with several guide and support paths 4 laid out along several height levels in order to simultaneously receive several assemblies for horizontal support 3 and molds 2, and at each of these height levels, the cooling zone 11 and the transfer devices 12, 13, each consisting of a guide and support path of an assembly for horizontal support and molds. According to this embodiment form, the filling stations 9 and mold removal stations 10 are each mobile in vertical translation between the different levels of height under the action of a motor mechanism that is appropriate for them, this motor mechanism ensuring, moreover, their positioning in height depending on the level of height selected. In the embodiment form selected, the guide rails are arranged according to three height levels. Always according to the preferred embodiment form, the filling station 9 and mold removal station 10 are mounted on a three-dimensional carrying structure and are united with the vertical guide columns 73 mounted in the guide bearings in translation, affixed to the carrying structure. The mechanism for activation in translation consists of a pneumatic power cylinder 74 affixed by its body to the carrying structure and by its shaft to the corresponding station 9, 10. The lower height level corresponds to the support of the station 9, 10 against the carrying structure while the upper height level corresponds to the maximum travel of the shaft of the power cylinder once opened out.

In order to keep the station 9 or 10 in the intermediate position, a mechanism is planned with a retractable stopper 75 coming to be arranged in the opened out position on the path of a stopping part 76 united with the station 9, 10. In the embodiment form selected, the stopper mechanism is made of a pneumatic power cylinder and the stopper piece is made of a horizontal traverse carried by two vertical arms affixed to the station 9, 10, the shaft of the power cylinder being arranged in the opened out position on the path of the traverse 76 which ensures in combination with the supply of the rear chamber of the shaft 74, the holding of the station 9, 10 in the intermediate position.

The washing unit 14 is made of two sets of at least two pressing instruments 77, mounted one above the other, in order to define a channel for pressing the products and for dilation, consisting of a product intake and a product output, these pressing instruments 77 being led in rotation on themselves by a motor mechanism in order to lead the products into the channel from the intake of the channel to the outlet. The pressing elements 77 of each set are arranged straight across from the pressing elements of the other and the pressing elements of each set are set at a distance from each other so as to make a space between them in which the molded article can become dilated after it has been compressed. The washing unit is equipped in addition with a mechanism for the injection of a liquid washing agent in the known space defined in a manner that the latex article can be loaded with liquid washing agent during its expansion in the space. During the later compression, the washing agent will be squeezed from the product mass, the latex foam rubber that is used causes the formation of a spongy product. The succession of the compressions and dilations allows the dimensional stabilization of the products made of latex and the successive washing operations free the product from any molding marks and mainly from diverse chemical agents that take part in the vulcanization. Thus, by this washing operation, the vulcanization of the product is stopped or greatly reduced.

In the selected embodiment form, each pressing instrument 77 is comprised of a cylindrical roller, provided along its axis of rotation, with two swivel pins at the end guided in rotation in two bearings of the structure of the washing unit 14. The motor mechanism is made of an electric motor 78 connected by the movement transmissions 79 of the chain and pinion gear type to two sets of pressing rollers 77, and the rollers 77 of each set are coupled to each other by cluster gears 80 which ensure their rotation all in a same direction opposite to the direction of rotation of the pressing rollers of the other set.

The injection mechanism of the washing agent in the gaps between the rollers is made up of the nozzles 81 arranged in the gaps and connected to a conduit 82 for supplying washing agent, itself connected to a pump 83 of a type designed to draw the washing agent into the container 84 and to send it to the supply conduit 82.

The drying unit 15 just like the washing unit 14 is made of two sets of at least two pressing elements 85, mounted one above the other, in order to define a channel for pressing and product dilation, consisting of a product intake and product outlet, the product intake being advantageously opposite the product outlet of the washing unit. The pressing instruments 85 are led in rotation on themselves by a motor mechanism in order to lead the products into the channel from the intake of the channel to the outlet. The pressing elements of each set are arranged straight across from the pressing elements of the other and the pressing elements of each set are set at a distance from each other so as to make a space between them in which the hot and dry air is introduced by an injection mechanism the outlet of the product dryer.

As in the washing machine, each pressing element 85 is comprised of a cylindrical roller, provided along its axis of rotation, with two swivel pins at the end guided in rotation in two bearings of the structure of the washing unit 14. The motor mechanism is made of an electric motor 86 connected by the movement transmissions 87 of the chain and pinion. gear type to two sets of pressing rollers 85, and the rollers 85 of each set are coupled to each other by cluster gears 88 which ensure their rotation all in a same direction opposite to the direction of rotation of the pressing rollers of the other set.

The mechanism for injection of the hot and dry air is made up of several nozzles 89 for injection of hot air arranged in the gaps between the pressing rollers 85, the nozzles being connected to a supply conduit 90 itself connected to a production center for hot and dry air 91. Also provided is an air extraction mechanism made up of a vacuum instrument.

To the drying unit as described, a microwave dryer is advantageously connected, this dryer being arranged opposite the outlet of the drying unit and being designed to complete the drying of the articles.

Advantageously, each pressing roller 77, 85 is provided with two helical grooves dug into its cylindrical surface, where these grooves are symmetrical relative to the median cross-section of the roller so as to keep the article in the channel axis when it is guided from the intake to the outlet.

The adjustments of the system as described allow the high rates of manufacturing and the time spent in the oven to be reduced on the order of several minutes.

It goes without saying that the invention presented here can have any adjustments and variations without going outside of the frame of the present patent.

We claim:

1. A system for manufacturing articles made from latex foam rubber comprising:
    a plurality of molds;
    an autoclave oven having a vulcanization means for vulcanizing the latex foam rubber in said plurality of molds, said oven having lateral walls and an upper wall and a lower wall, said oven comprising:
        a vulcanization chamber having a casing positioned on said lower wall of said oven, said casing being spaced from said lateral walls and said upper wall of said oven, said vulcanization chamber having a loading opening at one end thereof and an unloading opening at an opposite end thereof, each of said loading opening and said unloading opening having a door thereover so as to allow access to an interior of said casing of said vulcanization chamber;
        an enclosure in communication with said vulcanization chamber by passages formed at a lower part of said enclosure, said enclosure positioned in a space between said casing and said lateral walls and upper wall of said oven, said enclosure being stopped off at one end thereof;
        an inlet means at an upper part of said oven for introducing water vapor under pressure and at elevated temperatures into said enclosure; and
        an outlet means for extraction of the vapor and for evacuation of condensed water from said oven;
    a filling means cooperative with said oven for filling said plurality of molds with the latex foam rubber;
    an extraction means cooperative with said oven for extracting the vulcanized latex foam rubber from said plurality of molds;
    a washing means cooperative with said extraction means for washing the extracted vulcanized latex foam rubber; and
    a drying means cooperative with said washing means for drying the washed extracted vulcanized latex foam rubber.

2. The system of claim 1, said plurality of molds being arranged in side-by-side relationship, said plurality of molds being affixed to at least one horizontal support, said vulcanization chamber being in the form of a rectilinear tunnel, said filling means and said extraction means being arranged in adjoining relationship and in alignment with each other at one side of said oven, said system further comprising:
    a cooling means positioned in alignment along a longitudinal axis of said vulcanization chamber opposite said unloading opening;
    a first transfer means positioned between said filling means and said oven, said first transfer means for receiving the horizontal support and said plurality of molds from said filling means and for introducing the horizontal support and said plurality of molds into said vulcanization chamber by passing the horizontal support and said plurality molds through said loading opening;
    a positioning means located within said vulcanization chamber for positioning the horizontal support and said plurality of molds within said vulcanization chamber in a location spaced from walls of said vulcanization chamber, said positioning means for longitudinal centering of the horizontal support and said plurality of molds in said vulcanization chamber; and
    a second transfer means positioned between said cooling means and said extraction means, said second transfer means for receiving the horizontal support and said plurality of molds from said cooling means and for transferring the horizontal support and said plurality of molds towards said extraction means, said first and second transfer means and said cooling means each being of a three-dimensional structure having at least one path which is horizontal to and parallel to the longitudinal axis of said vulcanization chamber, said cooling means being fixed and said first and second transfer means being displacable in translation on a plurality of guide rails by motor means for moving between a position aligned with said filling means and a position aligned with said vulcanization chamber and between a position aligned with said cooling means and a position aligned with said extraction means, said first and second transfer means and said cooling means each having propulsion means for moving the horizontal support and said plurality of molds along their respective paths respectively therealong and therethrough.

3. The system of claim 2, each of said plurality of molds having a lower element defining a recess and an upper element covering the lower element so as to define a molding cavity therewith, said upper element having a drill hole extending therethrough such that latex foam rubber can be introduced into said molding cavity, each of said lower element and said upper element having a peripheral seat, said peripheral seat of said lower element being larger than said peripheral seat of said upper element, the mold being supported on said horizontal support by said seat of said lower element.

4. The system of claim 3, the horizontal support comprising a support frame formed by a pair of parallel girders that are joined together by a plurality of transverse beams so as to define cells in which respective molds of said plurality of molds are positioned, each of said plurality of molds resting on said girders on two sides opposite said seat of said lower element, said lower element of the mold being provided with at least one fork element positioned around one of the girders so as to position the mold relative to the horizontal support.

5. The system of claim 1, the door being vertically movable along vertical slides affixed to said oven, the door being movable between a low opening position and a high closing position, the system further comprising:
    a motor means cooperative with the door for the moving of the door between the low opening position and the high closing position, said motor means including a safety element connected to a safety plate that is connected to the door and is mounted in mobile vertical translation above an upper edge of the door.

6. The system of claim 5, said motor means being a pneumatic power cylinder having a shaft connected to the oven and a body connected to the door, said body of said power cylinder being received within a vertical housing formed in the door, said vertical housing having a lower opening at a lower edge of the door and an upper opening at the upper edge of the door, said safety element being positioned in said upper opening, said safety element including a valve connected to a rear chamber of said power cylinder.

7. The system of claim 5, the door being connected to at least one locking means for locking the door in a closed position, said locking means having a vertical bracket with a bore hole connected to the door and a cylindrical key connected to the oven, said cylindrical key being activated by a second motor means between a withdrawn position which is set off at a distance from said vertical bracket and a locking position engaged in said bore hole of said vertical bracket.

8. The system of claim 1, said loading opening and said unloading opening of said vulcanization chamber each having a continuous groove in which an air tight seal is received so as to form a plunger within said groove, said groove being connected to an air source means for supplying said air tight seal with compressed air so as to establish an air tight seal against the door, said groove being connected to a vacuum means for withdrawing air from said airtight seal so as to retract said air tight seal into said groove and away from the door.

9. The system of claim 2, said positioning means comprising at least two vertical frames formed by at least a pair of girders and cross pieces located within said vulcanization chamber, the vertical frames being located opposite to each other parallel to the longitudinal axis of said oven, the vertical frames being positioned against internal vertical sides of said vulcanization chamber so as to define at least one horizontal path for the horizontal support and said plurality of molds, the horizontal path extending from one of the openings of said vulcanization chamber to the other of the openings of said vulcanization chamber.

10. The system of claim 2, said first and second transfer means and said cooling means and said extraction means being arranged along an identical horizontal geometrical plane.

11. The system of claim 2, the guide path respectively of said first and second transfer means comprising two sets of rollers having the same diameter and arranged opposite to one another at a distance from each other, said two sets of rollers being mounted at idle and in overhanging relationship along the horizontal axes perpendicular to the longitudinal axis of the guide path.

12. The system of claim 2, the guide path of said cooling means comprising two sets of rollers having the same diameter and arranged opposite to each other at a distance from each other, said two sets of rollers being mounted at idle and overhanging on horizontal axes perpendicular to a longitudinal axis of the guide path of said cooling means.

13. The system of claim 9, the guide path of said positioning means for the horizontal support and said plurality of molds comprising two sets of rollers having the same diameter and arranged opposite to each other at a distance from each other, said two sets of rollers being mounted at idle and overhanging on horizontal axes perpendicular to the longitudinal axis of the guide path of said positioning means.

14. The system of claim 2, said propulsion means comprising at least one roller tangent to the guide path of said first and second transfer means, the roller being coupled to an output shaft of a motor element, said roller having a rotational axis perpendicular to the guide path and in pressured relationship against one of said girders of said support element.

15. The system of claim 2, said longitudinal centering means comprising a pressing assembly connected to a front end of said first transfer means and a stopper assembly connected to said oven and adjoining said unloading opening, said pressing assembly and said stopper assembly each being activated by at least one motor between a withdrawn position away from the horizontal support and said plurality of molds and an active position secant to the trajectory of the horizontal support and said plurality of molds.

16. The system of claim 15, said pressing assembly comprising a vertical bar mounted at the end of an arm structure affixed to a vertical shaft mounted in free rotation and fixed in translation in said first transfer means, said shaft being coupled to a motor mechanism.

17. The system of claim 16, said stopper assembly comprising a vertical plate connected to a lateral vertical wall of said oven, said stopper assembly further comprising a first stopper element that is mobile under the action of a motor element parallel to said unloading opening of said vulcanization chamber, said first stopper element being movable between a withdrawn position and an activation position, said first stopper element supporting a second stopper element that is mobile in translation under the action of a second motor element perpendicular to the opening of said vulcanization chamber between a withdrawal position and an activation position.

18. The system of claim 17, said first stopper element comprising:
a vertical plate having a pair of wings in which one of said pair of wings is perpendicular to a plane of said unloading opening and a second of said pair of wings is parallel to said unloading opening and carries said second stopper element thereon;
a pair of horizontal guide slides arranged parallel to said unloading opening, one of said pair of horizontal guide slides being above the other said pair of horizontal guide slides, each of said pair of horizontal guide slides affixed by one of the ends to said first wing of said vertical plate, said first motor element being a pneumatic power cylinder extending horizontally between said vertical plate and said first wing of said plate and being fixed by a body thereof to said support plate and having a shaft thereof connected to the first wing of said vertical plate, said second stopper element comprising a vertical stopper bar;
a pair of horizontal guide slides perpendicular to said unloading opening and arranged one above the other, each of said two horizontal guide slides being affixed by one end thereof to said stopper bar, said second motor element comprising a pneumatic power cylinder extending horizontally between said stopper bar and said second wing of said vertical plate of said first stopper element and being affixed by a body thereof to said second wing and by a shaft thereof to said vertical stopper bar.

19. The system of claim 2, said filling means comprising a horizontal container having a U-shaped cross section, said horizontal container being open at one end thereof, said horizontal container having vertical wings and a horizontal guide path therebetween, said guide path being open at an end thereof.

20. The system of claim 19, said guide path of said filling means comprising two sets of rollers having the same diameter and arranged opposite to each other at a distance from each other, one of said two sets of rollers being carried by one of said vertical wings of said horizontal container and the other of said two sets of rollers by another of said vertical wings of said horizontal container, each roller of said two sets of roller being mounted at idle and in overhanging relationship on a horizontal axis perpendicular to the horizontal axis of said guide path.

21. The system of claim 2, said extraction means comprising two vertical longitudinal wings positioned at a distance from each other, said two vertical longitudinal wings having a guide paths extending therebetween, said guide path being open at one end thereof, said guide path and the guide path of said first and second transfer devices and of said filling means and of said cooling means and of said vulcanization chamber being co-planar.

22. The system of claim 21, said guide path of said extraction means comprising two sets of rollers having the same diameter and arranged opposite to each other at a distance from each other, one of said two sets of rollers being carried on said vertical wings of said extraction means, another of said two sets of rollers being carried by another of said vertical wings of said extraction means, each roller of said two sets of rollers being mounted at idle and in overhanging relationship along a horizontal axis perpendicular to a longitudinal axis of said guide path.

23. The system of claim 2, said vulcanization chamber having a plurality of guide path arranged at different levels of height, said first and second transfer means and said cooling means each containing a guide path that is mobile in vertical translation between said different levels of height.

24. The system of claim 1, said washing means comprising two sets of at least two pressing elements mounted one above the other, the pressing elements defining a channel for pressing and expanding the vulcanized latex foam rubber, the pressing elements containing one intake for the vulcanized latex rubber foam and one outlet for the washed vulcanized latex foam rubber, the pressing element being driven by a motor mechanism so as to draw the vulcanized latex foam rubber into said channel from said intake to said outlet, the pressing element of one of said two sets being arranged straight across from the pressing elements of the other of said two sets, the pressing elements of each of said two sets being set at a distance from each other so as to define a base therebetween.

25. The system of claim 1, said drying means comprising two sets of at least two pressing elements mounted one above the other, the pressing elements defining a channel for pressing and dilating of the washed vulcanized latex foam rubber, said channel having a product intake and product outlet, the pressing elements being driven in rotation by a motor mechanism so as to draw the washed vulcanized latex foam rubber into said channel from said intake of said channel to said outlet of said channel, the pressing elements of one of said two sets being arranged straight across from the pressing elements of the other of said two sets, the pressing elements of each set being set at a distance from each other so as to define space therebetween so as to allow for the introduction of air from an air injection means, said drying means comprising a microwave dryer.

26. The system of claim 24, the pressing elements each comprising a cylindrical roller having a pair of helical grooves formed in an outer surface thereof, said two helical grooves being symmetrical relative to a median cross section of the roller.

27. The system of claim 2, said lower element of the mold having a continuous wall with a lower thickness forming an upper part of said mold cavity.

* * * * *